US008069015B2

(12) United States Patent  (10) Patent No.: US 8,069,015 B2
Chugg et al.  (45) Date of Patent: Nov. 29, 2011

(54) PSEUDO NOISE SEQUENCE ACQUISITION IN SPREAD SPECTRUM SYSTEMS

(75) Inventors: Keith M. Chugg, La Canada, CA (US); On Wa Yeung, Los Angeles, CA (US)

(73) Assignee: National Science Foundation, Arlington, VA (US)

( * ) Notice: Subject to any disclaimer, the term of this patent is extended or adjusted under 35 U.S.C. 154(b) by 134 days.

(21) Appl. No.: 11/738,438

(22) Filed: Apr. 20, 2007

(65) Prior Publication Data

US 2008/0215269 A1  Sep. 4, 2008

Related U.S. Application Data

(60) Provisional application No. 60/793,380, filed on Apr. 20, 2006.

(51) Int. Cl.
*H03F 1/26* (2006.01)
*H03M 13/00* (2006.01)

(52) U.S. Cl. ........ 702/189; 702/106; 714/746; 714/758; 714/781

(58) Field of Classification Search .................. None
See application file for complete search history.

(56) References Cited

U.S. PATENT DOCUMENTS

2003/0237039 A1* 12/2003 Qiu ............................... 714/758
2006/0085727 A1*  4/2006 Azenkot et al. ............. 714/792

OTHER PUBLICATIONS

Kschischang et al., Iterative Decoding of Compound Codes by Probability Propagation in Graphical Models, Jan. 1998, IEEE Journal on Selected Areas in Communications, vol. 16 No. 1, p. 1-11.*

Shimizu et al., Partially-Parallel LDPC Decoder Based on High-Efficiency Message-Passing Algorithm, Proceedings of the 2005 International Conference on Computer Design (ICCD'05), IEEE, p. 1-8.*

Richardson et al., The Capacity of Low-Density Parity-Check Codes Under Message-Passing Decoding, Feb. 2001, IEEE Transactions on Inforamtion Theory, vol. 47 No. 2, p. 599-618.*

Ungerboeck, G., Trellis-Coded Modulation with Redundant Signal Sets, Feb. 1987, IEEE Communications Magazine, vol. 25, No. 2, pp. 5-21.*

Park et al., CRC Codes Based on a Non-Primitive Generator Polynomial: A New Error Control Scheme Targeting a Prescribed Set of Error Patterns, May 8, 2006, IEEE, DOI: 10.1109/INTMAG.2006. 375883, pp. 301.*

Zhu et al., Iterative Message Passing Techniques for Rapid Code Acquisition, Military Communications Conference, 2003. MILCOM 2003. IEEE.

Abbasfar and Yao, "An efficient and practical architecture for high speed turbo decoders," *IEEE 58th Vehicular Technology Conference*, Oct. 2003, 1:337-341.

Aji and McEliece, "The generalized distributive law," *IEEE Trans. Information Theory*, 46(2):325-343 (Mar. 2000).

(Continued)

*Primary Examiner* — Drew A Dunn
*Assistant Examiner* — Mischita Henson
(74) *Attorney, Agent, or Firm* — Fish & Richardson P.C.

(57) ABSTRACT

Systems and methods for signal analysis are described. The method can include digitizing a signal modulated by a pseudo noise (PN) sequence, dividing the digitized signal into a plurality of sample blocks, and estimating a PN phase embedded in a sample block of the plurality of sample blocks using an iterative message passing algorithm (iMPA) executed on a redundant graphical model.

20 Claims, 13 Drawing Sheets

OTHER PUBLICATIONS

Aji, S.M., "Graphical models and iterative decoding," Ph.D. dissertation, California Institute of Technology, 2000, 64 pages.

Bahl, L.R. et al., "Optimal decoding of linear codes for minimizing symbol error rate," *IEEE Transactions on Information Theory*, 20: 284-287 (1974).

Benedetto and Montorsi, "Design of parallel concatenated convolutional codes," *IEEE Trans. Communication*, 44:591-600 (May 1996).

Benedetto et al., "Serial concatenation of interleaved codes: performance analysis, design, and iterative decoding," *IEEE Trans. Information Theory*, 44(3):909-926 (May 1998).

Benedetto et al., "Soft-input soft-output modules for the construction and distributed iterative decoding of code networks," *European Trans. Telecommun.*, 9(2):155-172 (Mar.-Apr. 1998).

Berrou and Glavieux, "Near optimum error correcting coding and decoding: turbo-codes," *IEEE Trans. Communication*, 44(10):1261-1271 (Oct. 1996).

Berrou et al., "Near shannon limit error-correcting coding and decoding: turbo-codes," *Proc. International Conf. Communications*, Geneva, Switzerland, May 1993, pp. 1064-1070.

Chugg and Zhu, "A new approach to rapid PN code acquisition using iterative message passing techniques," *IEEE J. Select. Areas Commun.*, 2005, 23(5):884-897 (May 2005).

Dielissen and Huisken, "State vector reduction for initialization of sliding windows MAP," *2nd International Symposium on Turbo Codes & Related Topics*, Brest, France, 2000, pp. 387-390.

Gallager, "Low-Density Parity-Check codes," *IEEE Trans. Information Theory*, 8(1):21-28, (Jan. 1962).

Gallager, "Low-Density Parity-Check Codes," Cambridge, MA: Monograph, MIT Press, 1963, 90 pages.

Hekstra, "An alternative to metric rescaling in Viterbi decoders," *IEEE Trans. Communication*, 37(11):1220-1222 (1989).

Homier and Scholtz, "Rapid acquisition of ultra-wideband signals in the dense multipath channel," *IEEE Conference on Ultra Wideband Systems and Technologies*, 2002, pp. 105-109.

Kschischang et al., "Factor graphs and sum-product algorithm," *IEEE Trans. Information Theory*, 47:498-519 (Feb. 2001).

MacKay and Neal, "Near Shannon limit performance of low density parity check codes," *IEEE Electronics Letters*, 1996, 32(18):1645-1646.

Masera et al., "VLSI architectures for turbo codes," *IEEE Trans. on Very Large Scale Integration (VLSI)*, 7(3):369-379 (1999).

McEliece et al., "Turbo decoding as an instance of Pearl's 'belief propagation' algorithm," *IEEE J. Select. Areas Commun.*, 16(2):140-152 (Feb. 1998).

O'Donnell et al., "An integrated, low power, ultra-wideband transceiver architecture for low-rate, indoor wireless systems," *IEEE CAS Workshop on Wireless Communications and Networking*, Sep. 2002, 8 pages.

Polydoros and Weber, "A unified approach to serial search spread-spectrum code acquisition—Part I: General Theory," *IEEE Trans. Communication*, 32:542-549 (May 1984).

Polydoros and Weber, "A unified approach to serial search spread-spectrum code acquisition—Part II: A Matched-Filter Receiver," *IEEE Trans. Communication*, 32:550-560 (May 1984).

Santhi and Vardy, "On the effect of parity-check weights in iterative decoding," *Proc. IEEE Internat. Symp. Information Theory (ISIT)*, Chicago, IL, Jun. 27-Jul. 2, 2004, p. 100.

Schwartz and Vardy, "On the stopping distance and the stopping redundancy of codes," *IEEE Trans. Information Theory*, 52(3):922-932 (Mar. 2006).

Tanner, "A recursive approach to low complexity codes," *IEEE Trans. Information Theory*, vol. IT-27, No. 5, pp. 533-547 (1981).

Viterbi, A.J., "An Intuitive Justification and a Simplified Implementation of the MAP Decoder for Convolutional Codes," *IEEE J. Select. Areas Commun.*, vol. 16, No. 2, pp. 260-264 (Feb. 1998).

Wiberg, "Codes and decoding on general graphs," Ph.D. dissertation, Linköping University (Sweden), Dissertation No. 440, 1996, http://www.essrl.wustl.edu/~jao/itrg/wiberg.pdf, 104 pages.

Yang and Hanzo, "Acquisition of m-Sequences Using Recursive Soft Sequential Estimation," *IEEE Trans. Communication*, 52(2):199-204 (Feb. 2004).

Yang and Hanzo, "Iterative soft sequential estimation assisted acquisition of m-sequences," *IEEE Electronics Letters*, 38(24):1550-1551 (2002).

Yedidia et al., "Generating code representations suitable for belief propagation decoding," *Proc. 40th Allerton Conference Commun., Control, and Computing*, Monticello, IL, Oct. 2002, pp. 447-456.

Yeung, O.W. and K.M. Chugg, "An Iterative Algorithm and Low Complexity Hardware Architecture for Fast Acquisition of Long PN Codes in UWB Systems," *Journal of VLSI Signal Processing Sytems*, vol. 43, No. 1, pp. 25-42 (Apr. 2006).

Yoon and Bar-Ness, "A parallel MAP algorithm for low latency turbo decoding," *IEEE Communications Letters*, 6(7):288-290 (Jul. 2002).

* cited by examiner

PSEUDO NOISE SEQUENCE ACQUISITION IN SPREAD SPECTRUM SYSTEMS

CROSS-REFERENCE TO RELATED APPLICATIONS

This application claims priority to U.S. Provisional Application 60/793,380, filed Apr. 20, 2006. The disclosure of the prior application is considered part of (and is incorporated by reference in) the disclosure of this application.

FEDERALLY SPONSORED RESEARCH OR DEVELOPMENT

The U.S. Government may have certain rights in this invention pursuant to Army Res. Office Grant No.: DAAD19-01-1-0477 and NSF Grant No.: CCF-0428940.

TECHNICAL FIELD

The following description relates to phase acquisition in spread spectrum systems.

BACKGROUND

Spread spectrum (SS) systems, such as ultra-wideband (UWB) systems transmit information spread over a large bandwidth. In a UWB system, the source signal is spread over a bandwidth many times larger than its original bandwidth. Pseudo-random or pseudo noise (PN) sequences are periodic sequences with long periods that allow the transmitted signal to have a relatively low signal to noise ratio (SNR). In a direct sequence UWB (DS/UWB) system, the transmitted signal is a train of pulses with polarities determined by the product of a PN binary sequence and the incoming binary source data sequence. For a UWB receiver, the first step of demodulation is to de-spread the signal. In a DS/UWB system, this is achieved by multiplying the incoming samples by a local replica of the PN sequence. The receiver can determine the PN code phase embedded in the transmitted signal by analyzing the data collected from a short observation window to synchronize the local replica. The time period of the observation window is short compared to the PN code period. Determining the PN code phase is called PN acquisition.

SUMMARY

In one example, a signal analysis method includes running an iterative message passing algorithm (iMPA) on a standard graphical model augmented with multiple redundant models for fast PN acquisition. In another example, the hardware architecture for implementing this signal analysis is described.

In one aspect, a method for signal analysis includes digitizing a signal modulated by a pseudo noise (PN) sequence, dividing the digitized signal into a plurality of sample blocks, and estimating a PN phase embedded in a sample block of the plurality of sample blocks using an iterative message passing algorithm (iMPA) executed on a redundant graphical model.

This, and other aspects, can include one or more of the following features. The estimated PN phase can be made available to a user. The redundant graphical model can be generated by combining a primary model and at least one auxiliary model. The primary model and the auxiliary model can be based on a same generator polynomial. The iMPA can use a forward backward algorithm. The redundant graphical model can be a cyclic graphical model. The signal can be received from a source in a spread spectrum system. The digitized signal can be stored. Each sample block of the plurality of sample blocks can be stored. The estimated PN phase can be extrapolated over the plurality of sample blocks. The extrapolated sequence can be statistically compared with the digitized signal. The statistical comparison can be correlation. The estimated PN phase can be considered satisfactory if a correlation value is greater than the threshold.

In another aspect, a system includes an analog to digital converter configured to digitize a signal, a channel metric access unit to divide the signal into a plurality of sample blocks, and hardware architecture configured to estimate a PN phase embedded in a sample block of the plurality of sample blocks using an iterative message passing algorithm (iMPA) executed on a redundant graphical model.

This, and other aspects, can include one or more of the following features. The system can further include a receiver configured to receive the signal from a source in a spread spectrum system. This system can further include a first storage unit configured to store the digitized signal. The system can further include a second storage unit configured to store each sample block of the plurality of sample blocks. The system can further include an extrapolation unit configured to extrapolate the estimated PN phase over the plurality of sample blocks. The system can further include a verification unit configured to statistically compare the extrapolated sequence with the digitized signal. The verification unit can further be configured to perform correlation on the extrapolated sequence and the digitized signal.

The system and techniques described can present one or more of the following advantages. The iMPA can enable PN acquisition at low SNR. The iMPA can offer the speed of parallel search and acquisition performance similar to that of serial search at short block lengths. The iMPA can be implemented in hardware to acquire PN sequences with long period. The complexity of the iMPA implementing hardware can be simpler than that implementing parallel search while being faster than that implementing serial search. The use of multiple redundant models can cause faster convergence and operation at lower SNR without increases in the hardware complexity. The multiple models can be aggregated into a single model without significant increase in hardware complexity to reduce memory usage. The logic design based on the described architecture can be easily fit into a small field programmable gate array (FPGA).

The details of one or more implementations are set forth in the accompanying drawings, the description, and the claims below. Other features and advantages will be apparent from the description and drawings, and from the claims.

DESCRIPTION OF DRAWINGS

Like reference symbols in the various drawings indicate like elements.

DETAILED DESCRIPTION

Figure 1:
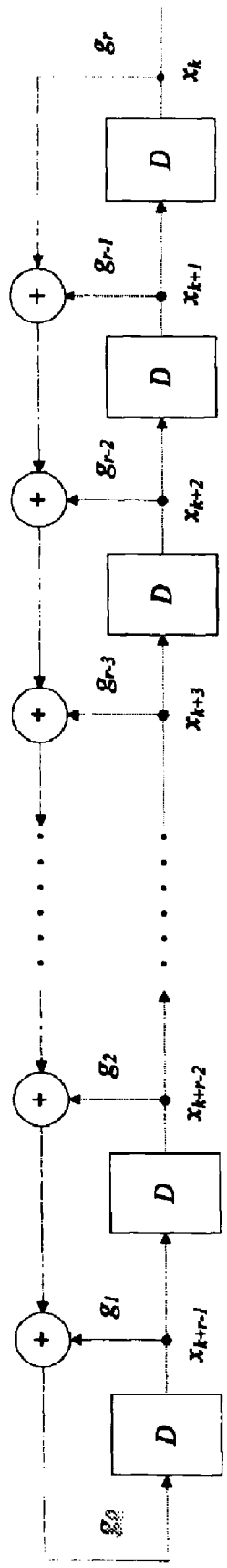
FIG. 1 is an example of a linear feedback shift register structure.

FIG. 1 depicts a linear feedback shift register (LFSR) structure for m-Sequence generation. A maximal-length sequence or m-Sequence has the maximum possible period for an r-stage shift register. An m-sequence $x_k$ can be generated by an r-stage linear feedback shift register structure as shown in FIG. 1. When the registers are loaded with any non-zero values, the generated sequence can cycle through all $2^r-1$ possible non-zero states before repeating (i.e., its period is $2^r-1$). Mathematically, the sequence structure can be expressed by Equation 1.

$$x_k = g_1 x_{k-1} \oplus g_2 x_{k-2} \oplus \ldots \oplus g_r x_{k-r} \tag{1}$$

Where $g_0=g_r=1$, $g_k \in \{0,1\}$ for $1<k<r$ and $\oplus$ is the modulo-2 addition. The generator polynomial is $g(D)=D^r+g_{r-1}D^{r-1}+g_{r-2}D^{r-2}+\ldots+D^0$ where D is the unit delay operator. Given r, the set of $g_k$ values that can generate an m-Sequence can be determined. The m-Sequences can be used as spreading sequences in spread spectrum systems due to their excellent auto-correlation and cross-correlation properties.

For a DS/UWB system, a model for acquisition characterization can be represented by Equation 2.

$$z_k = \sqrt{E_c}(-1)^{x_k}+n_k \tag{2}$$

In Equation 2, $z_k$, $0 \leq k \leq M-1$, is the noisy sample received by the acquisition module, $x_k$, $0 \leq k \leq M-1$, is the spreading m-Sequence, $E_c$, is the transmitted energy per pulse and $n_k$ is additive white Gaussian noise (AWGN) with variance ($N_0/2$). The acquisition module, $x_k$, can be generated by an r-stage LFSR and $r \ll M \ll 2^r-1$. The acquisition module can estimate $x_k$ based on $z_k$, $0 \leq k \leq M-1$ for a given frame epoch estimate and decide whether the frame epoch estimate is correct. In the present description, the estimate of $x_k$, denoted by $x'_k$, is obtained by running an iterative message passing algorithm. Once r consecutive $x'_k$ are obtained, the rest of the sequence is determined by extrapolating the estimate by Equation 1 to ensure that $x'_k$ is consistent with Equation 1. Subsequently, $z_k$ is correlated with $x'_k$, $0 \leq k \leq M-1$ to check whether the correlation threshold is reached.

The PN acquisition is formulated as a decoding problem and an iMPA is applied. The cyclic graphical models can be chosen for low complexity decoding. In one example, the generator polynomial chosen can be $g(D)=D^{15}+D^1+D^0$. For a binary variable X, the message passed (i.e., soft information) in a cyclic graph is an approximation of the negative log likelihood ratio represented by:

$$-\log \frac{P_r(X=1)}{P_r(X=0)}$$

In this example, in each iteration, the algorithm can successively update messages and decisions can be made by comparing a decision message $M_{dec}$ to 0 where $M_{dec}$ is an approximation of:

$$-\log \frac{P_r(x_k=1)}{P_r(x_k=0)}$$

If $M_{dec} \geq 0$, $x'_k=0$, otherwise, $x'_k=1$. The absolute value of $M_{dec}$ can be interpreted as the confidence of the decision. If the algorithm converges, $M_{dec}$ can stabilize after certain number of iterations indicating some level of confidence in the decisions.

Figure 2A:
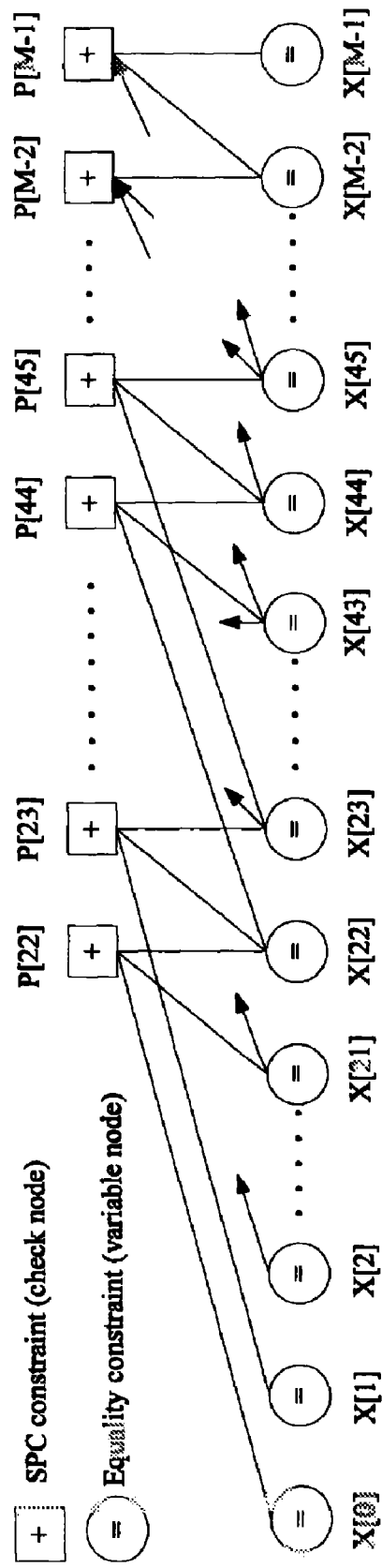
FIG. 2A is a Tanner graph for a generator polynomial.
Figure 2B:
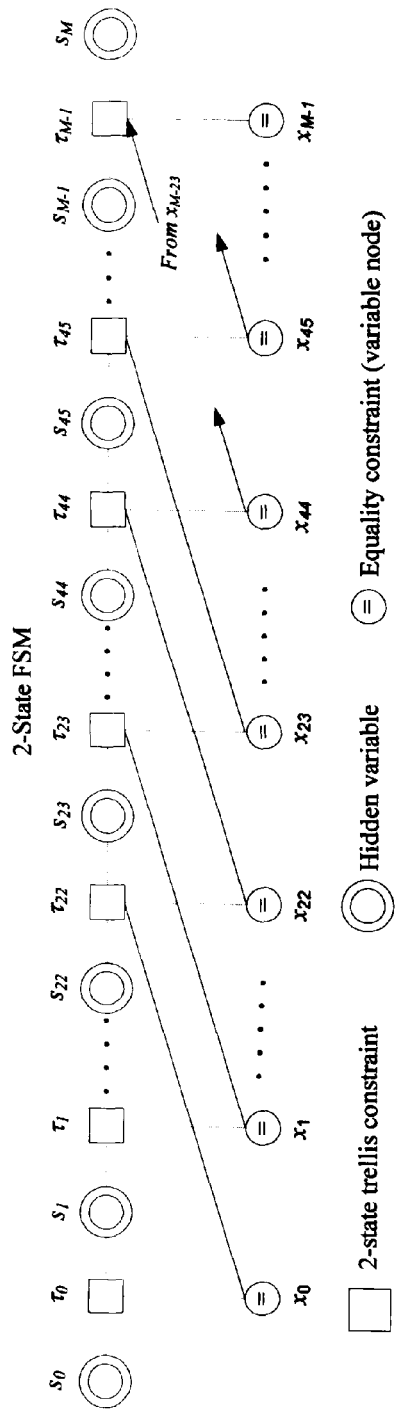
FIG. 2B is a Tanner-Wiberg graph for a generator polynomial.

FIGS. 2A and 2B depict graphical models representing the generator polynomial, $g(D)=D^{22}+D^1+D^0$. FIG. 2A depicts a Tanner graph for the generator polynomial, $g(D)=D^{22}+D^1+D^0$. FIG. 2B depicts a Tanner-Wiberg graph for the generator polynomial, $g(D)=D^{22}+D^1+D^0$, with hidden variable $S_k=x_{k-1}$ introduced. In the present description, acquiring the m-Sequence with generator polynomial $g(D)=D^{22}+D^1+D^0$ is considered. To improve the performance of the iMPA, the new decoding graph for $g(D)=D^{22}+D^1+D^0$ is constructed using multiple graphical models. Each graphical model can fully capture the PN code structure. This introduces redundancy.

Figure 3:
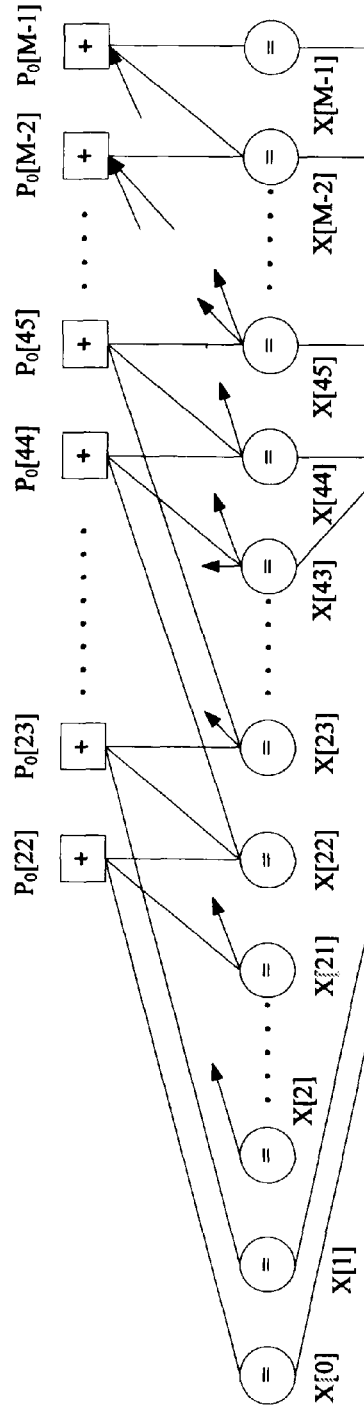
FIG. 3 is an example of forming a graphical model using one primary and one auxiliary models.

FIG. 3 depicts an example of forming an $n^{th}$ order model by combining a primary model and an $n^{th}$ order auxiliary model. For example, the primary model can be represented by the generator polynomial, $g(D)=D^{22}+D^1+D^0$. The $1^{st}$ order auxiliary model can be represented by the generator polynomial, $g(D)=D^{44}+D^2+D^0$. Each of the subgraphs is based on a different generator polynomial to the same m-sequence. Different non-primitive polynomials can be introduced to generate the same sequence. For example, let $x_k$ be the sequence generated by $g(D)=D^{22}+D^1+D^0$. This presents the Equations 3, 4, and 5.

$$x_k \oplus x_{k-1} \oplus x_{k-22}=0 \tag{3}$$

$$x_{k-1} \oplus x_{k-2} \oplus x_{k-23}=0 \tag{4}$$

$$x_{k-22} \oplus x_{k-23} \oplus x_{k-44}=0 \tag{5}$$

Adding Equations 3, 4, and 5, it can be seen that $x_k+x_{k-2}+x_{k-44}=0$. Therefore, $g(D)=D^{44}+D^2+D^0$ also generates the same sequence. The analysis can be extended to show that all generator polynomials represented by Equation 6 generate the same sequence.

$$g(D)=D^{22 \times 2^n}+D^{2 \times 2^n}+D^0, n=0,1,2,3,\ldots \tag{6}$$

The graphical model based on Equation 6 is referred to as the $n^{th}$ order auxiliary model and the one based on $g(D)=D^{22}+D^1+D^0$ as the primary model. Also, the model that combines the primary model and the $1^{st}, 2^{nd} \ldots (n-1)$ order auxiliary models as the $n^{th}$ order model. The decoding graph for an $n^{th}$ order model is formed by constraining the output of primary model and each of the $i^{th}$ order auxiliary models $1 \leq i \leq n$ to be equal.

Figure 4:
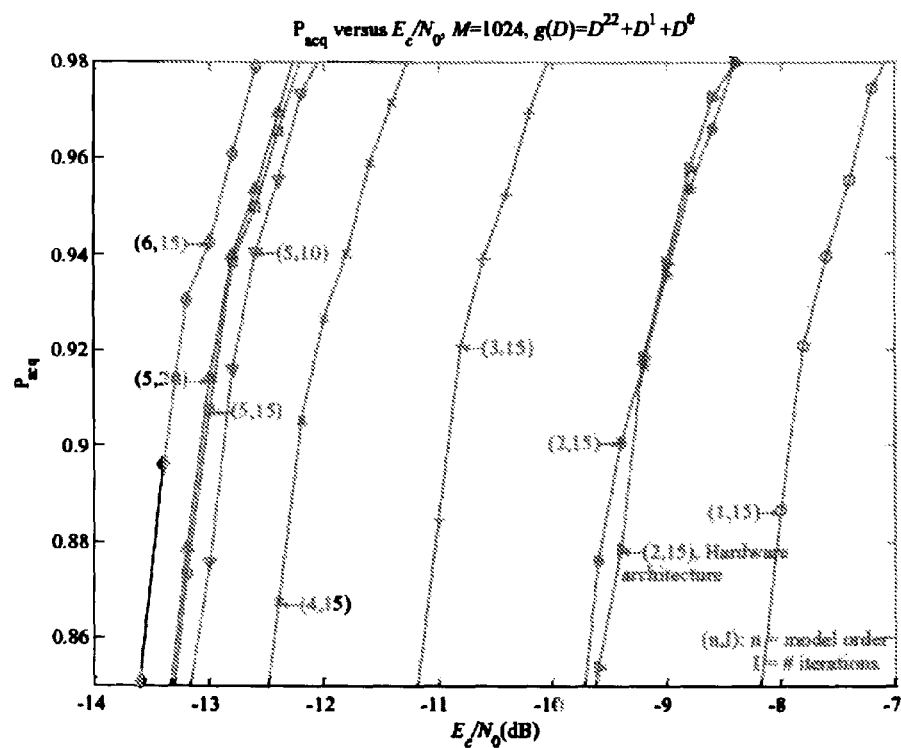
FIG. 4 is a plot of performance improvement obtained by combining multiple models.

FIG. 4 depicts a performance improvement of the iPMA by combining multiple models. Further, FIG. 4 depicts acquisition performance v/s ($E_c/N_0$) for using an $n^{th}$ order model on $g(D)=D^{22}+D^1+D^0$, M=1024. The acquisition performance of the hardware implementation is marked as "(2,15), hardware architecture." Combining the decoding decisions of each individual auxiliary model can dramatically improve the convergence behavior. For each additional auxiliary model introduced, a gain of around 1 dB is observed. Practical convergence in 10 iterations can be obtained for a $5^{th}$ order model.

Figure 5:
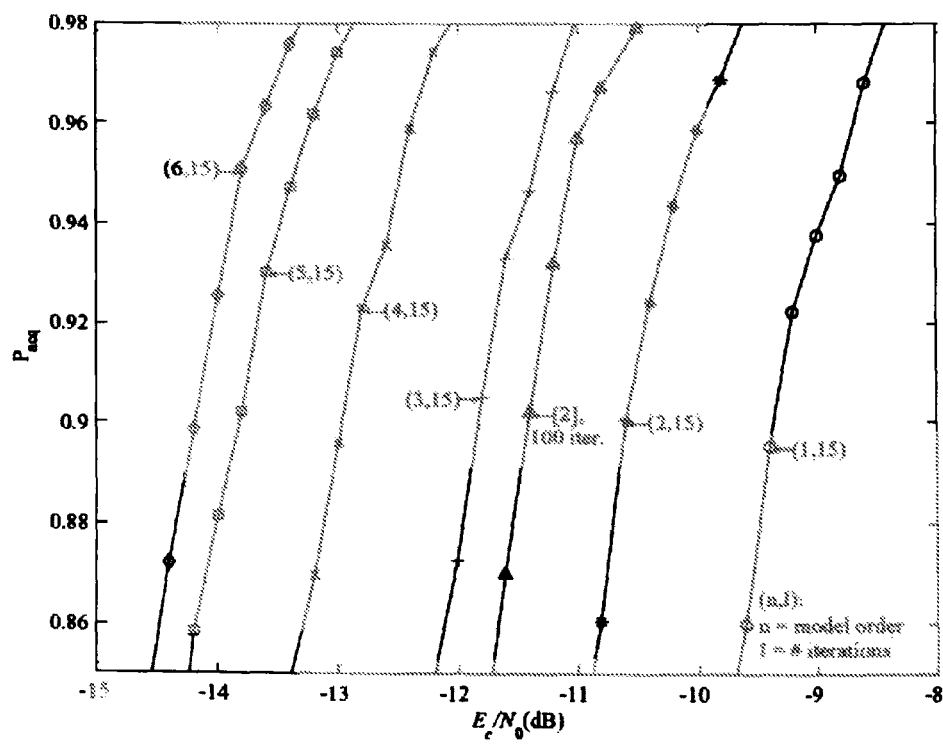
FIG. 5 is a plot of performance for using an $n^{th}$ order model.

FIG. 5 depicts the performance for a generator polynomial given by $g(D)=D^{15}+D^1+D^0$. Further, FIG. 5 depicts acquisition performance v/s ($E_c/N_0$) for using an $n^{th}$ order model on $g(D)=D^{15}+D^1+D^0$, M=1024. It can be seen that the multiple model algorithm also works for other m-Sequences.

The baseline algorithm is summarized below.

---

Input : $M_{ch}[k] = z_k$, $0 \leq k \leq M - 1$;
Output : Acquisition decision $x'_k$, $0 \leq k \leq M - 1$;
For i = 1 ... I do
    Run the iMPA to get $M_{dec}$, the algorithm can be based on different graphical models such as FIG. 3;
    If $M_{dec} \geq 0$ then
        $x'_k = 0$
    else
        $x'_k = 1$
    end
    divide $\{x'_k\}$ into non-overlapping 22-pulse segments;
    choose the segment corresponding to the maximum $$\sum_{k=22 \cdot j}^{22 \cdot j+21} |M_{dec}[k]| \quad ;$$

set $x'_k$ equal to the extrapolated value of the chosen segment by (1), $0 \leq k \leq M - 1$;

$$\text{correlate } z_k \text{ with } x'_k: c = \sum_{k=0}^{k=M-1} z_k x'_k \quad ;$$

if c > threshold then
        declare acquisition;
        break;
    end
end

---

The complexity of the current algorithm is same as both the decoding and correlation operations, which is of O(M).

When an $n^{th}$ order model is used for the iMPA, the pulses are decoded by n different models during each iteration. The hardware module that performs iMPA for each auxiliary model is an iterative decoder. The basic building block in the algorithm is an iterative decoder that decodes the sequence generated by $g(D)=D^{22}+D^1+D^0$. In some implementations, the hardware architecture can be based on the Tanner graph for the generator polynomial depicted in FIG. 2A. In other implementations, the hardware architecture can be based on the Tanner-Wiberg graph for the generator polynomial depicted in FIG. 2B. For the Tanner graph representation (FIG. 2A), the number of messages needed to be saved in each iteration is the number of edges in the graph. Therefore, the minimum storage requirement is 3M messages. Alternatively, the Tanner-Wiberg graph representation (FIG. 2B) with hidden variables presents a memory efficient generator polynomial decoder SISO architecture. FIG. 2B depicts an explicit index diagram.

Figure 6A:
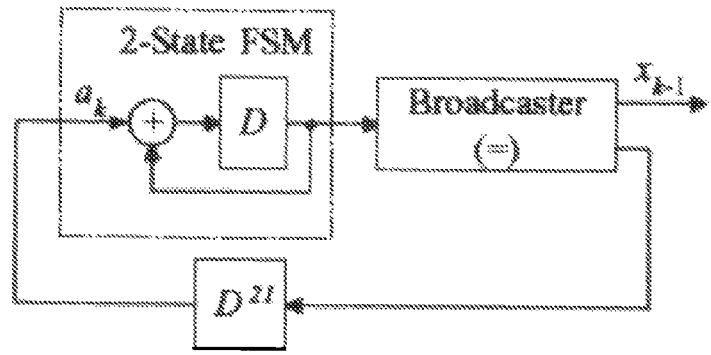
FIG. 6A is a decomposition of a generator polynomial.

FIG. 6A depicts deriving the generator polynomial decoder architecture from LFSR structure. The generator polynomial can be $g(D)=D^{22}+D^1+D^0$. Further, FIG. 6A depicts the decomposition of the generator polynomial as a combination of a 2-state finite state machine (FSM), a broadcaster, and a delay block. The update equations for the Tanner-Wiberg graph can be explained by FIG. 6A which decomposes the sequence generating LFSR structure into three parts: one 2-state $g(D)=D+1$ finite state machine (FSM)[2], one delay block ($D^{21}$) and one broadcaster (i.e., an equality constraint).

Figure 6B:
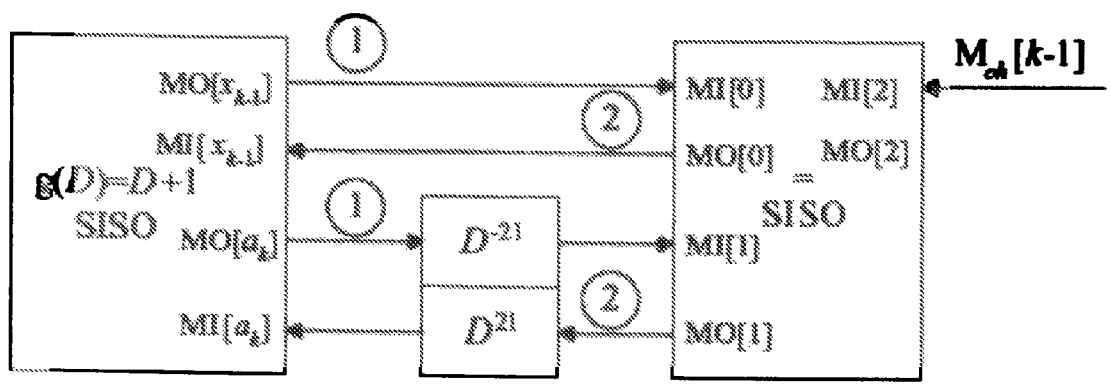
FIG. 6B depicts a decoding graph.

FIG. 6B depicts a decoding graph. The decoding graph in FIG. 6B can be derived by applying the standard iterative message passing rules and by replacing each component by a soft-in soft-out (SISO) module which performs the a-posteriori probability (APP) decoding. FIG. 6B depicts an implicit index diagram where the time index is hidden in the graphical representation. Associated iterative processing is the same in the index diagrams depicted in FIG. 2B and FIG. 6B. Further, FIG. 6B depicts a corresponding generator polynomial iterative decoder architecture, wherein the circled number is the activation order.

If MI[i] and MO[i] are the input and output messages with ports defined in FIG. 6B, the broadcaster SISO update equation is given by:

$$MO[i] = \sum_{j=0}^{j=2} MI[j] - MI[i]$$

The 2-state $g(D)=D+1$ recursive FSM SISO can be implemented by the forward backward algorithm (FBA). Assuming that $F_k$ and $B_k$ are the forward and backward state metric and $MI[x_k]$, $MO[x_k]$, $MI[a_k]$, and $MO[a_k]$ are the input and output ports defined in FIG. 6B, the update equations for each iteration are:

$$F_0=0 \tag{7}$$

$$B_M=0 \tag{8}$$

$$F_{k+1}=\min(MI[a_k],F_k)-\min(0,F_k+MI[a_k])+MI[x_k] \tag{9}$$

$$B_{k+1}=\min(MI[a_k],MI[x_k]+B_{k+1})-\min(0,B_{k+1}+MI[x_k]+MI[a_k]) \tag{10}$$

$$MO[a_k]=\min(B_{k+1}+MI[x_k],F_k)-\min(0,F_k+B_{k+1}+MI[x_k]) \tag{11}$$

$$MO[x_k]=F_{k+1}+B_{k+1}-MI[x_k] \tag{12}$$

$$M_{dec}=MI[x_k]+MO[x_k] \tag{13}$$

Based on Equations 7-13, it can be seen that the FSM SISO requires two types of memory. The first type is for storing the 2M messages passed between the $g(D)=D+1$ SISO and the broadcaster SISO. Their values are updated based on the results from the previous iteration. The second type is for storing the FSM state metrics $F_k$ and $B_k$, which are recalculated during every iteration. In other words, the FSM state metric memory can be reused once operations in the current iteration are finished. Therefore, $B_k$ need not be stored if MO[·] are updated immediately once both $F_k$ and $B_k+1$ become available. Further, the state metric memory can be reduced by updating the state metrics segment by segment to reuse the memory within the current iteration. For example, if the segment size is M/8, the total memory requirement becomes M/8 state metrics +2M messages which is less than the 3M messages requirement based on FIG. 2A. FIG. 6B depicts one type of activation schedule. The 2-state FSM SISO completes the message update, sends the update to the broadcaster, then the broadcaster updates and returns the messages, thereby completing one iteration.

Figure 7:
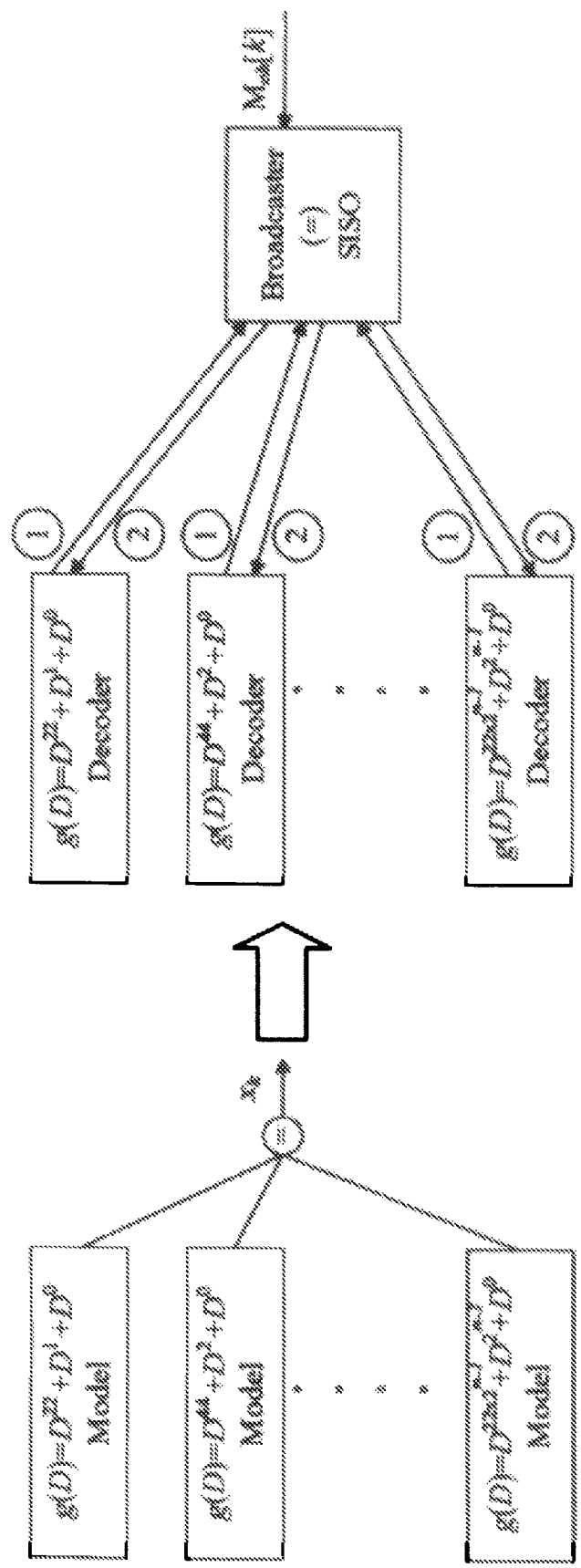
FIG. 7 is an example of standard iterative message passing rules.

FIG. 7 depicts the standard iterative message passing rules in an iterative decoder architecture for an $n^{th}$ order model depicting the combined model and the iterative decoder architecture with the activation order circled. Once all the auxiliary model decoders are ready, the $n^{th}$ order model decoder can be created by forming an additional broadcaster (equality) constraint. The decoding architecture follows directly by applying the standard iterative message passing rules. If the model is a $2^{nd}$ order model with the SISO structure chosen to be of the type shown in FIG. 2A, then FIG. 7 is equivalent to FIG. 3 and the memory requirement equals to 6M messages which is the sum of the memory requirement for each SISO.

Figure 8A:
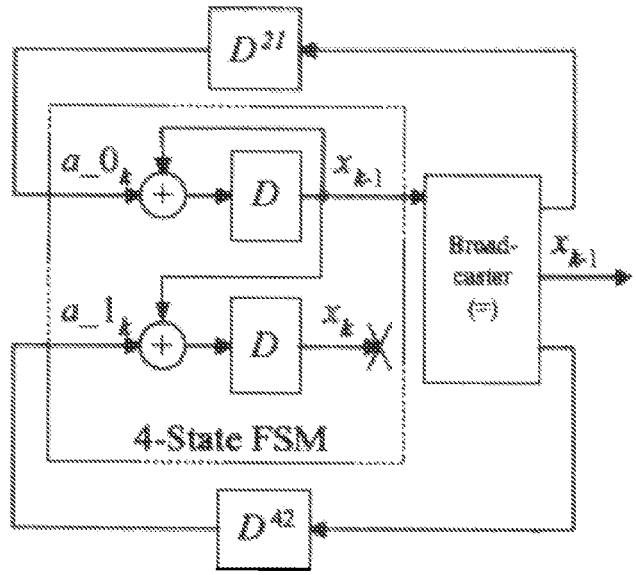
FIG. 8A is an example of implementing a model using two decoders.
Figure 8B:
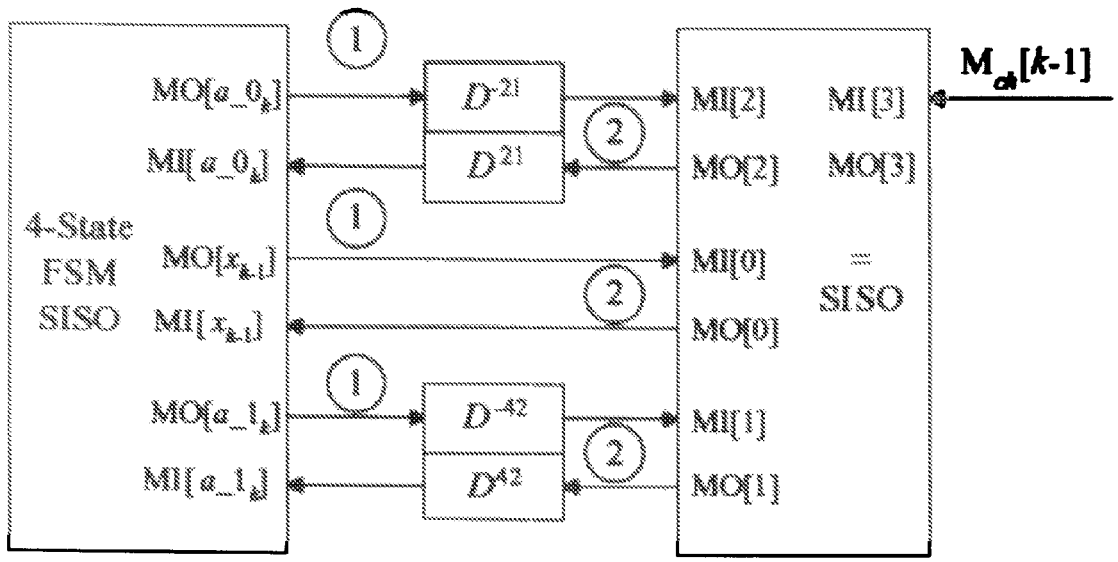
FIG. 8B is an example of a decoder architecture.

FIG. 8A depicts modeling a FSM using two identical FSMs. All auxiliary decoders can be constructed using the $g(D)=D^{22}+D^1+D^0$ decoder. This can be achieved by index partitioning on the output of the higher order model. In some implementations, the index partitioned output can be equivalent to the output of the primary model. For example, the FSM that generates the $g(D)=D^{22}+D^1+D^0$ sequence can be modeled as two identical FSMs each generating the $x_k=x_{k-1}+x_{k-22}$ sequence. One generates the sequence at even indices. FIG. 8B depicts the corresponding decoder which consists of two $g(D)=D^{22}+D^1+D^0$ decoders. In this case, since each decoder only decodes M/2 pulses, the total memory requirement for messages is the same as an M-pulse $g(D)=D^{22}+D^1+D^0$ decoder. This idea can be extended to higher order auxiliary model decoders. Specifically, $x_k$ generated by Equation 6 can be partitioned into $2^n$ sub-sequences denoted by:

$$x_{2^n k+i}, 0 \leq i \leq 2^n-1$$

In the above expression, each sub-sequence can be generated by $g(D)=D^{22}+D^1+D^0$. The corresponding decoder can be constructed using multiple $g(D)=D^{22}+D^1+D^0$ decoders similar to FIG. 8B.

Figure 9:
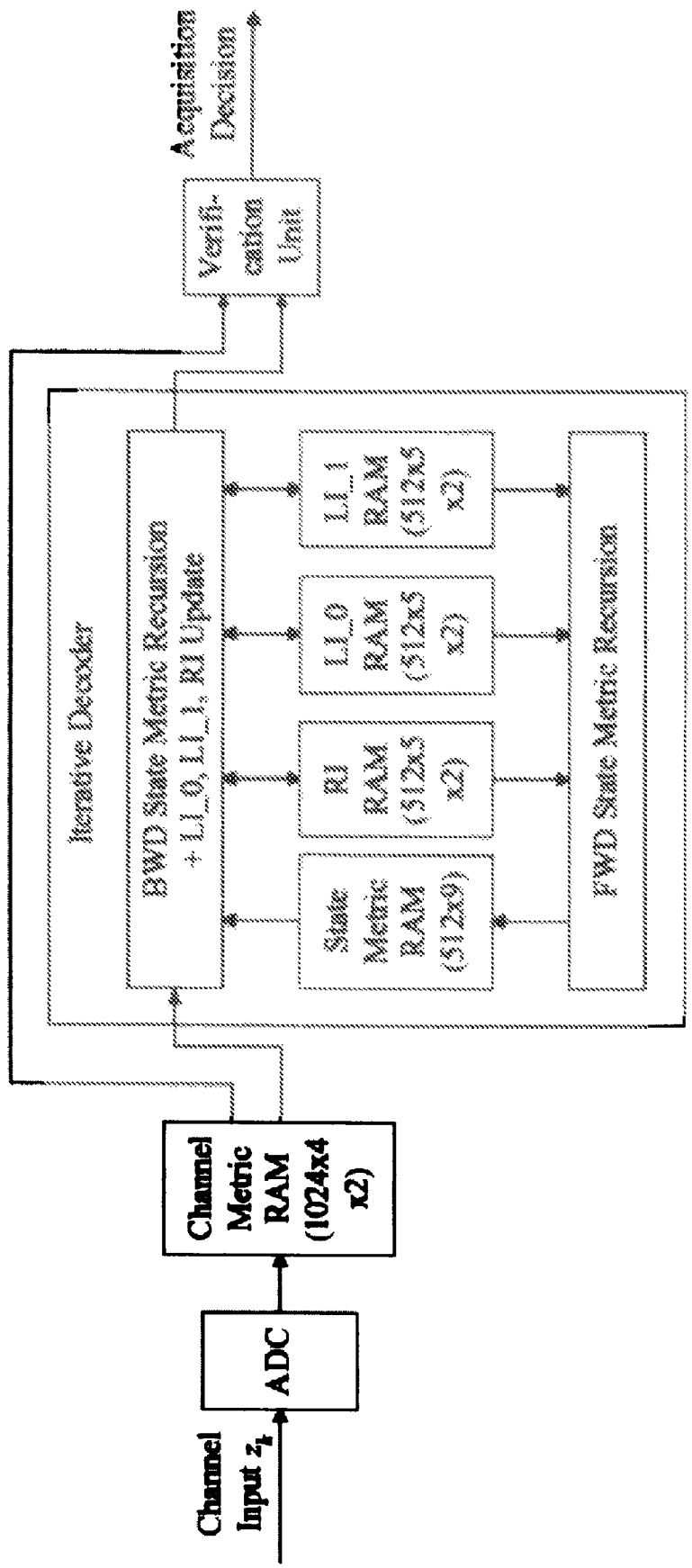
FIG. 9 is a block diagram of an acquisition module for a finite state machine.
Figure 10A:
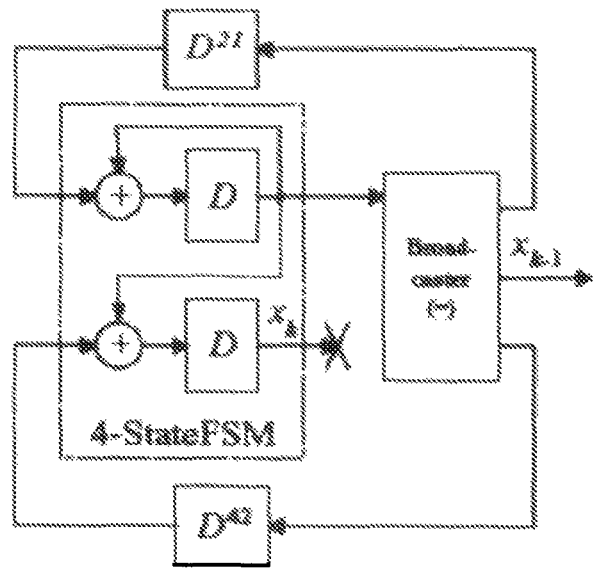
FIGS. 10A-10D are index diagrams for the finite state machine soft in soft out (SISO) decoder.

FIG. 9 depicts a block diagram of an acquisition module where the PN sequence $g(D)=D^{22}+D^1+D^0$ is decoded over an observation window of M=1024 using the $2^{nd}$ order model architecture. The three 2-state FSM SISOs (one for $g(D)=D^{22}+D^1+D^0$ and two for $g(D)=D^{44}+D^2+D^0$), shown in the estimator architecture of FIG. 7, were combined together using a single 4-state FSM as shown in FIG. 10A. The new FSM captures all the information of the original FSMs and lowers the memory requirements from 4M messages plus state metrics to approximately 3M messages plus state metrics. Moreover, by using a single FSM, routing resources are saved by lowering the bandwidth requirement for the channel metrics ($M_{ch}[k]=z_k$) memory since it is now accessed only by one FSM-SISO instead of three FSM SISOs. Using the 4-state FSM can save memory and routing, and may require more logic in the FSM SISO implementation.

Figure 10B:
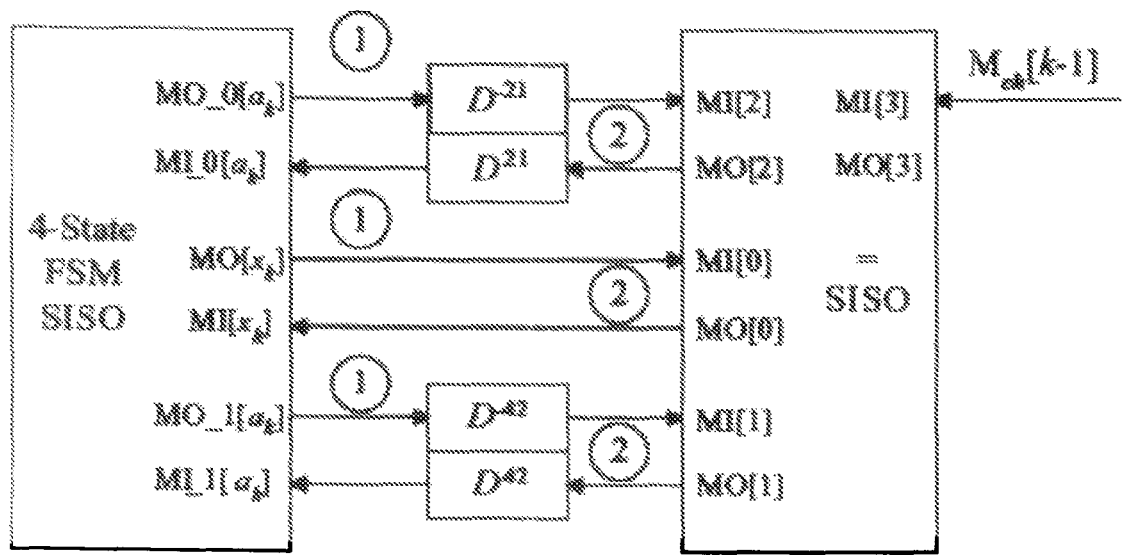
Figure 10C:
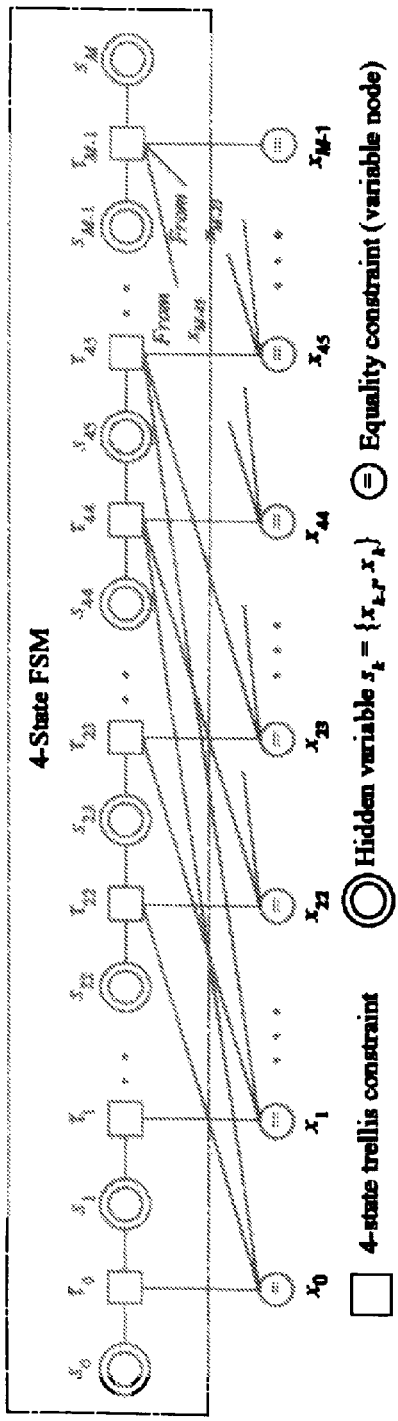
Figure 10D:
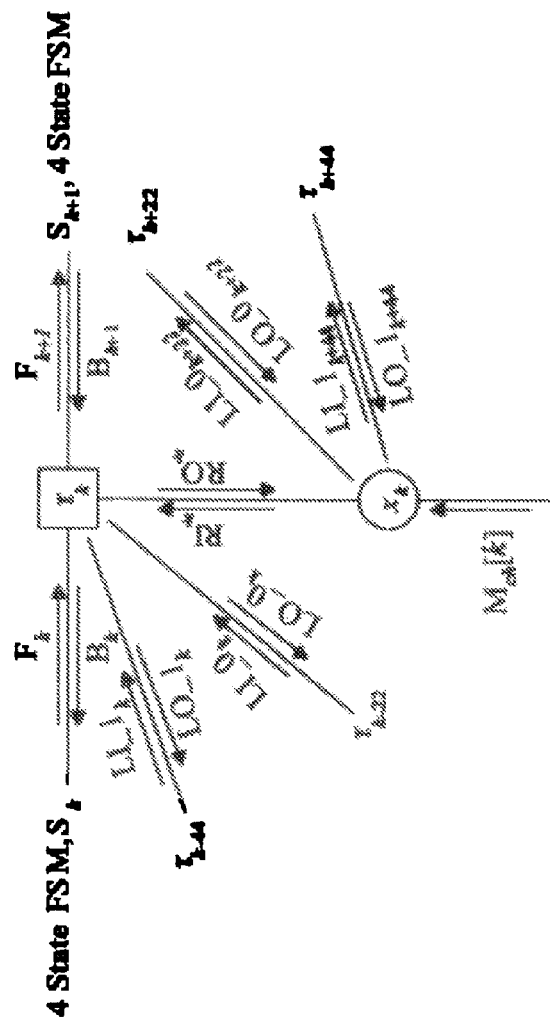

The 4-state FSM SISO is also based on the forward backward algorithm. The state is defined as $S_k=\{x_{k-1}, x_k\}$ and the corresponding decoder is shown in FIG. 10B. The decoder depicted in FIG. 10B is an implicit index diagram. The explicit index diagram (i.e., the Tanner-Wiberg graph) is shown in FIG. 10C. The state transition table is shown in the state transition table of the 4-state FSM (Table 1). The messages passed are shown in FIG. 10D. The update equations are obtained by applying the standard message passing rules (Equations 14 to 30) on either FIG. 10B or FIG. 10C.

$$F_0=0 \tag{14}$$

$$B_M=0 \tag{15}$$

$$F_{k+1}[0]=\min(F_k[0],F_k[2]+LI\_1_k) \tag{16}$$

$$F_{k+1}[1]=\min(F_k[0]+RI_k+LI\_0_k+LI\_1_k, F_k[2]+RI_k+LI\_0_k) \tag{17}$$

$$F_{k+1}[2]=\min(F_k[1]+LI\_0_k, F_k[3]+LI\_0_k+LI\_1_k) \tag{18}$$

$$F_{k+1}[3]=\min(F_k[1]+RI_k+LI\_1_k, F_k[3]+RI_k) \tag{19}$$

$$B_{k-1}[0]=\min(B_k[0], B_k[1]+RI_k+LI\_0_k+LI\_1_k) \tag{20}$$

$$B_{k-1}[1]=\min(B_k[2]+LI\_0_k, B_k[3]+RI_k+LI\_1_k) \tag{21}$$

$$B_{k-1}[2]=\min(B_k[0]+LI\_1_k, B_k[1]+RI_k+LI\_0_k) \tag{22}$$

$$B_{k-1}[3]=\min(B_k[2]+LI\_0_k+LI\_1_k, B_k[3]+RI_k) \tag{23}$$

$$\begin{aligned}LO\_0_k = \min(&F_k[0]+B_{k+1}[1]+RI_k+LI\_1_k,\\
&F_k[1]+B_{k+1}[2],\\
&F_k[2]+B_{k+1}[1]+RI_k,\\
&F_k[3]+B_{k+1}[2]+LI\_1_k) - \min(F_k[0]+B_{k+1}[0],\\
&F_k[1]+B_{k+1}[3]+RI_k+LI\_1_k,\\
&F_k[2]+B_{k+1}[0]+LI\_1_k,\\
&F_k[3]+B_{k+1}[3]+RI_k)\end{aligned} \tag{24}$$

$$\begin{aligned}LO\_1_k = \min(&F_k[0]+B_{k+1}[1]+RI_k+LI\_0_k,\\
&F_k[1]+B_{k+1}[3]+RI_k,\\
&F_k[2]+B_{k+1}[0],\\
&F_k[3]+B_{k+1}[2]+LI\_0_k) - \min(F_k[0]+B_{k+1}[0],\\
&F_k[1]+B_{k+1}[2]+LI\_1_k\\
&F_k[2]+B_{k+1}[1]+RI_k+LI\_0_k,\\
&F_k[3]+B_{k+1}[3]+RI_k)\end{aligned} \tag{25}$$

$$\begin{aligned}RO_k = \min(&F_k[0]+B_{k+1}[1]+LI\_0_k+LI\_1_k,\\
&F_k[1]+B_{k+1}[3]+LI\_1_k,\\
&F_k[2]+B_{k+1}[1], +LI\_0_k,\\
&F_k[3]+B_{k+1}[3]) - \min(F_k[0]+B_{k+1}[0],\\
&F_k[1]+B_{k+1}[2]+LI\_0_k,\\
&F_k[2]+B_{k+1}[0]+LI\_1_k,\\
&F_k[3]+B_{k+1}[2]+LI\_0_k+LI\_1_k)\end{aligned} \tag{26}$$

$$RI_k=LO\_0_{k+22}+LO\_1_{k+44}+M_{ch}[k] \tag{27}$$

$$LI\_0_{k+22}=RO_k+LO\_1_{k+44}+M_{ch}[k] \tag{28}$$

$$LI\_1_{k+44}=RO_k LO\_0_{k+22}+M_{ch}[k] \tag{29}$$

$$M_{dec}=RO_k+LO\_0_{k+22} LO\_1_{k+44}+M_{ch}[k] \tag{30}$$

In other implementations, multiple auxiliary models can be combined to form a single FSM. For example, a $3^{rd}$ order model can be implemented using a 16-state FSM.

TABLE 1

State transition table of the 4-state FSM

| $S_{k-1} = \{x_{k-2}, x_{k-1}\}$ | $S_k$ | $x_k$ | $x_{k-22}$ | $x_{k-44}$ |
|---|---|---|---|---|
| 00 (0) | 00 (0) | 0 | 0 | 0 |
| 00 (0) | 01 (1) | 1 | 1 | 1 |
| 01 (1) | 10 (2) | 0 | 1 | 0 |
| 01 (1) | 11 (3) | 1 | 0 | 1 |
| 10 (2) | 00 (0) | 0 | 0 | 1 |
| 10 (2) | 01 (1) | 1 | 1 | 0 |
| 11 (3) | 10 (2) | 0 | 1 | 1 |
| 11 (3) | 11 (3) | 1 | 0 | 0 |

The internal FSM state metric memory can be reduced by dividing the observation window into multiple segments and running the forward backward algorithm (FBA) segment by segment. In some implementations, the observation window (M=1024) is divided into 8 segments. There is one forward unit and one backward unit running 15 iterations from index 0 to index 1024. During each iteration, the forward unit updates the state metric sequentially from pulse 0 to pulse 1025. The backward unit computes the state metric in the following order: 127→0, 255→128, . . . , 1023→896. Such a sequence of calculations can cause an inability to determine the backward metric $B_{128}[i]$, $0 \leq i \leq 3$ when computing 127→0, $B_{256}[i]$ when computing 255→128, etc. The problem can be solved by running the backward unit for an additional "warm-up" period. The backward state metric at the segment boundary can be well approximated by starting a backward state recursion just several constraint lengths away. Excluding the warm-up, (i.e., setting $B_{128}[i]=0$) can incur a loss of 0.25 dB in $E_c/N_0$. Including an additional backward unit can enable running a design using the warm-up approach at full-speed, wherein one unit can warm up while the other is doing the update. The additional unit can be saved if, instead of the warm-up approach, the $B_{128}[i]$ values from the previous iteration are copied. This is feasible because the warm-up period is only required if an FBA-SISO in isolation needs to be approximated. For an iterative system, starting the backward recursions based on earlier iterations values is equivalent to a change in the activation schedule for the iMPA on the cyclic graph, and as such does not significantly affect the performance.

Figure 11:
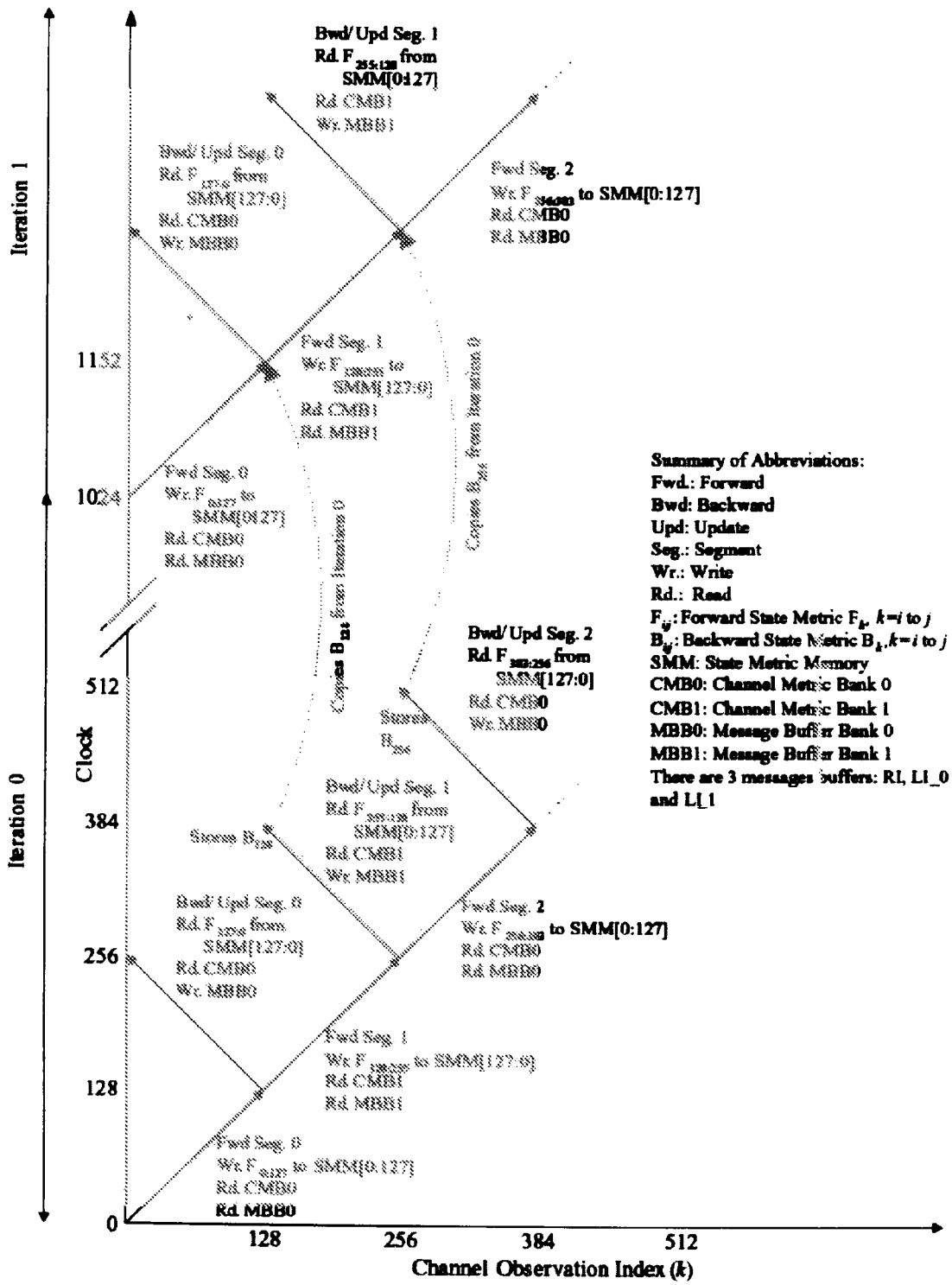
FIG. 11 is an example of processing and memory access pipeline for a 4-state decoder.

FIG. 11 depicts the processing and memory access pipeline for the 4-state decoder. Once both the forward and backward state metrics become available, $LI\_0_k$, $LI\_1_k$, $RI_k$ and $M_{dec}[k]$ can be computed and the FSM state metric memory can be released immediately. FIG. 11 also shows the update sequence as well as the corresponding memory access.

Figure 12:
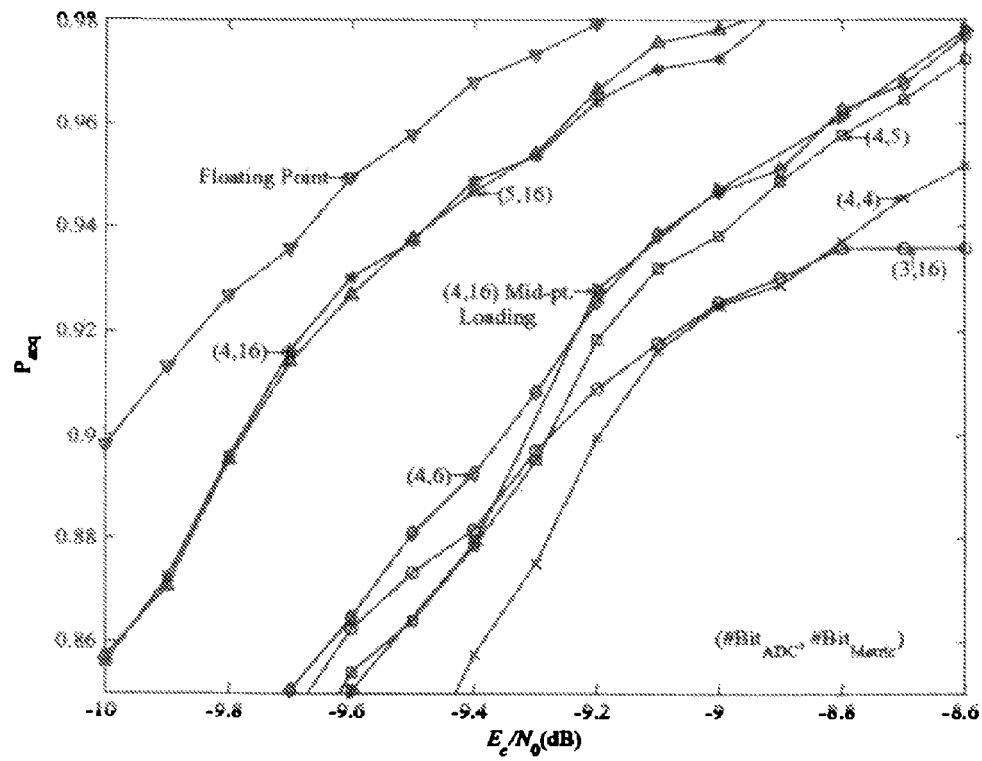
FIG. 12 is the performance of various bit width combinations.

In the present description, the bit widths are determined by simulations in two steps. In the first step, $LI\_0_k$, $LI\_1_k$ are fixed to be of 16 bits. Further, it is determined that 4 bits of analog to digital converter (ADC) output is sufficient. FIG. 12 depicts the performance for various bit width combinations. For each ADC bit width, the scale q that sets the ADC dynamic range ($ADC_{out}$=quantize ($q \cdot z_k$)) for performance can be optimized. For a 4-bit ADC, $q_{opt}$ is found to be 1.65 by simulation. The performance for the standard mid-point loading q=3.5 when the ADC is of 4 bits. In the second step, the bit width for the messages LI_0, LI_1 and RI are determined. Since their values may grow as the decoder iterates, this determination can avoid using excessive bits for storage by clipping them after (FBA/=) SISO activation. As shown in FIG. 12, 5 bits are sufficient when the ADC bit width is 4.

The bit width for the state metric need only be big enough for the difference between $F_k[i]$ $0 \leq i \leq 3$. Subtracting $F_k[0]$ from $F_k[i]$ $0 \leq i \leq 3$, it can be shown that the differences (i.e., the normalized $F_k[i]$) are bounded between −128 and 127 for 5-bit messages. As a result, it can be represented by 8 bits. Similarly, the normalized $B_k[i]$ $0 \leq i \leq 3$ can be represented by 8 bits for $0 \leq k \leq 1024$. Since the normalized $F_k[0]$ and $B_k[0]$ are always 0, they need not be stored. The normalization approach can be applied for all binary variables to reduce memory usage by half and only requires one subtraction. For example, $LI\_0_k$ is a shorthand for $LI\_0_k[1]$ where $LI\_0_k[0]=0$ for all k. or the quaternary state metric variables, 9 bits can be used to represent the state metric instead of 8 bits.

FIG. 11 further depicts access pipelines for several modules concurrently accessing memory. By partitioning the memory, contention can be avoided without the use of multiport memory. The message memories (LI_0, LI_1, and RI) can be divided into two banks of 512 entries. One bank is for the odd FBA segment and the other for the even FBA segment. By this arrangement, there are, at most, 2 concurrent accesses and LI_0, LI_1, and RI can be implemented using 2-port memories. For the FSM state metric, the forward unit writes to the memory while both the backward and LI-0, LI_1, and RI update unit read the same data from the memory. As a result, a single bank of 2-port memories is used. The channel metric memory is divided into two banks each comprising 1024 entries. The ADC and the acquisition module work on different banks. By subdividing each bank into two sub-banks, one for the FBA odd segment and the other for the FBA even segment, there can be, at most, two simultaneous accesses to the same segment. Therefore, the channel metrics can also be stored using 2-port memories. In order to reuse the state metric memory once the backward metric is computed, the FSM state metrics can be stored in the physical memory in reverse order for even segments. For example, the even segment $F_{128}$ to $F_{255}$ can be stored in the state metric memory [127:0] while the odd segment $F_0$ to $F_{127}$ are stored in the state metric memory [0:127]. The details are also shown in FIG. 11. Using 2-port memories provides design simplicity in implementation. Alternatively, the design can be ported to single port memory only architecture by doubling the bus width and time division multiplexing the access.

Figure 13:
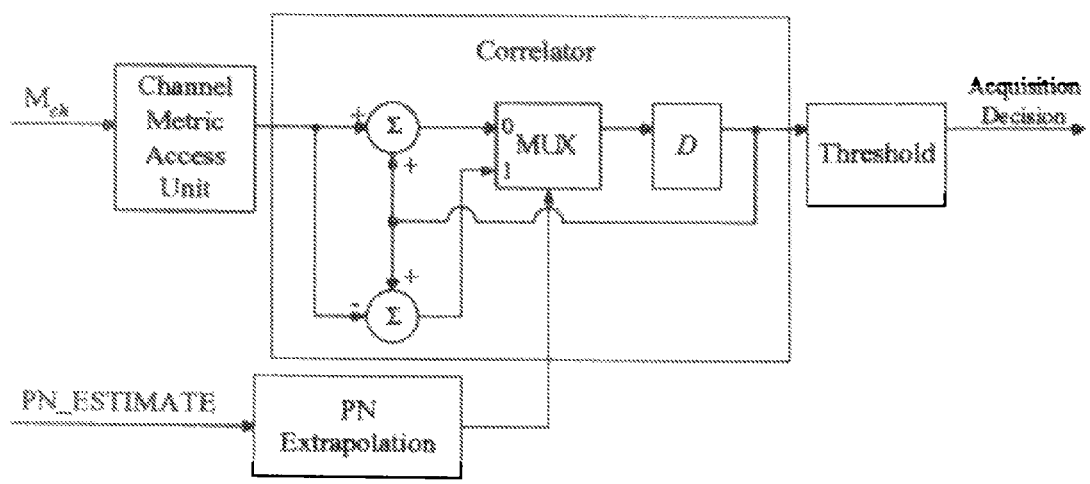
FIG. 13 is an example of a verification unit for a PN acquisition module.

FIG. 13 depicts the verification unit. The verification unit consists of two parts, a PN sequence extrapolation unit and a correlator unit. The extrapolation unit extends the 22-bit PN estimate it receives to the whole observation window. The correlation unit then correlates this sequence with the channel metric. To improve efficiency, the correlator output is checked every M/4 pulses. If the correlator output exceeds the check point threshold, correlation continues. If the final correlation value exceeds the final threshold, acquisition is declared. The final threshold is found by simulation. In some implementations, the final threshold is chosen to be 0.65·q·1024. FIG. 12 also depicts the acquisition performance. The frequency of false alarm is 0 in 5000 trials when the signal is absent.

The architecture can be implemented using hardware description languages (HDL). In some implementations, the architecture can be implemented using Verilog HDL. The code can be synthesized using Synplicity, then mapped by Xilinx Foundation to a Xilinx Virtex 2 device (XC2v250-6). The number of bits implemented in block RAM is 28160, the number of 4-input look-up tables (LUTs) used is 1621 and the number of slices used is 1039. The design can run at 73 MHz. The baseline can decode $Freq_{clk}/15$ pulses per second. Assuming a 60 MHz clock, the architecture can generate a PN code phase decision every [15/(60 MHz)]·1024=2.56 μs. The decode process is repeated for each frame epoch estimate until the correct frame epoch is found. Assuming the frame time $T_f$=250 ns (i.e., pulse rate=4 Mpulses/s) and pulse width $T_p$=1.6 ns, the approximate average acquisition time of our prototype system is $T_{acq}=(2.56\ \mu s)\cdot(T_f/T_p)\cdot(0.5)=20$ ms with $P_{acq}=0.95$ at $(E_c/N_0)=-8.9$ dB. In this calculation, it is assumed that half of the frame epoch values are searched on average.

Figure 14:
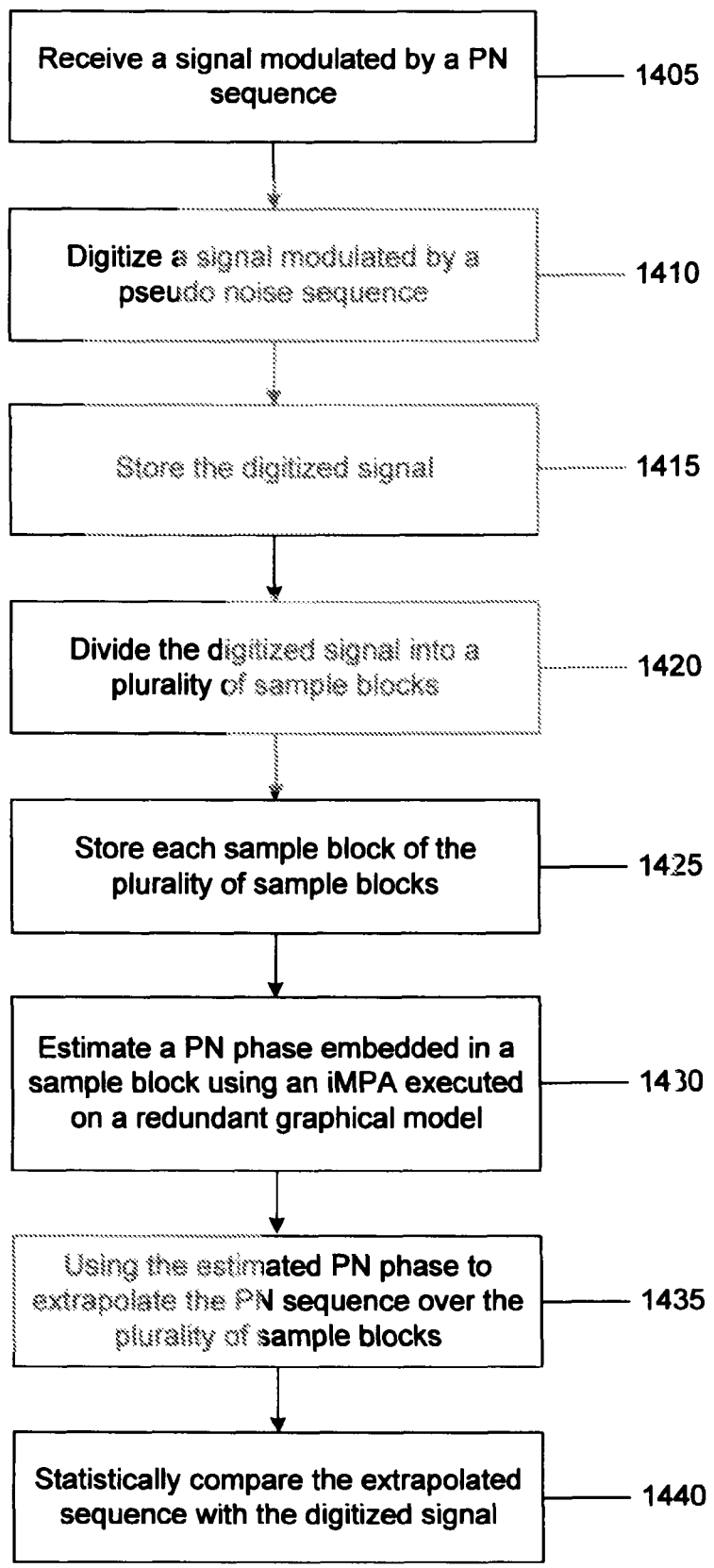
FIG. 14 is a flow chart of an example of a process for signal analysis.

FIG. 14 depicts a flow chart of an example of a process for determining a phase of a PN sequence in a signal. A signal modulated by a PN sequence can be received at 1405. The PN sequence can be generated using linear feedback shift registers (LFSRs). The signal can be received from a UWB system. The signal can digitized at 1410. In some implementations, the modulated signal can be digitized by the UWB system. In other implementations, the modulated signal can be digitized by an ADC that is not included in the UWB system. The digitized signal can be stored at 1415. In some implementations, the digitized signal can be stored in random access memory (RAM). The digitized signal can be divided into several sample blocks at 1420. Each sample block can be represented by an observation window. The number of sample blocks into which the digitized signal is divided can be altered based on user preference. In some examples, the digitized signal can be divided into 1024 sample blocks. Each of the sample blocks can be stored at 1425. In some implementations, the digitized signal and the sample blocks can be stored in the same storage unit. Alternatively, the digitized signal and the sample blocks can be stored in separate storage units. A PN sequence embedded in a sample block can be estimated using an iMPA executed on a redundant graphical model at 1430. The iMPA can be executed based on a schedule similar to the schedule described in Zhu and Chugg, "Iterative message passing techniques for rapid code acquisition," Military Communications Conference, vol. 1, 2003, 434-439, the entire contents of which are incorporated herein by reference. The redundant graphical model can be based on a generator polynomial, e.g., the generator polynomial represented by Equation 6. The redundant graphical model can be generated by combining a primary model and at least one auxiliary model. In some implementations, both the primary model and the at least one auxiliary model can be generated from the same generator polynomial, e.g., the generator polynomial represented by Equation 6. The redundant graphical model can be a cyclic model. The cyclic model can be chosen for low complexity decoding. The estimated PN phase of the sample block can be used to extrapolate the PN sequence over the multiple sample blocks at 1435. The extrapolated PN sequence can be correlated with the stored digitized signal at 1440. If the correlation coefficient satisfies a threshold, then the estimated PN phase can be declared as a suitable estimate. If not, then steps 1405 to 1440 can be repeated for a new signal modulated by the PN sequence.

Figure 15:
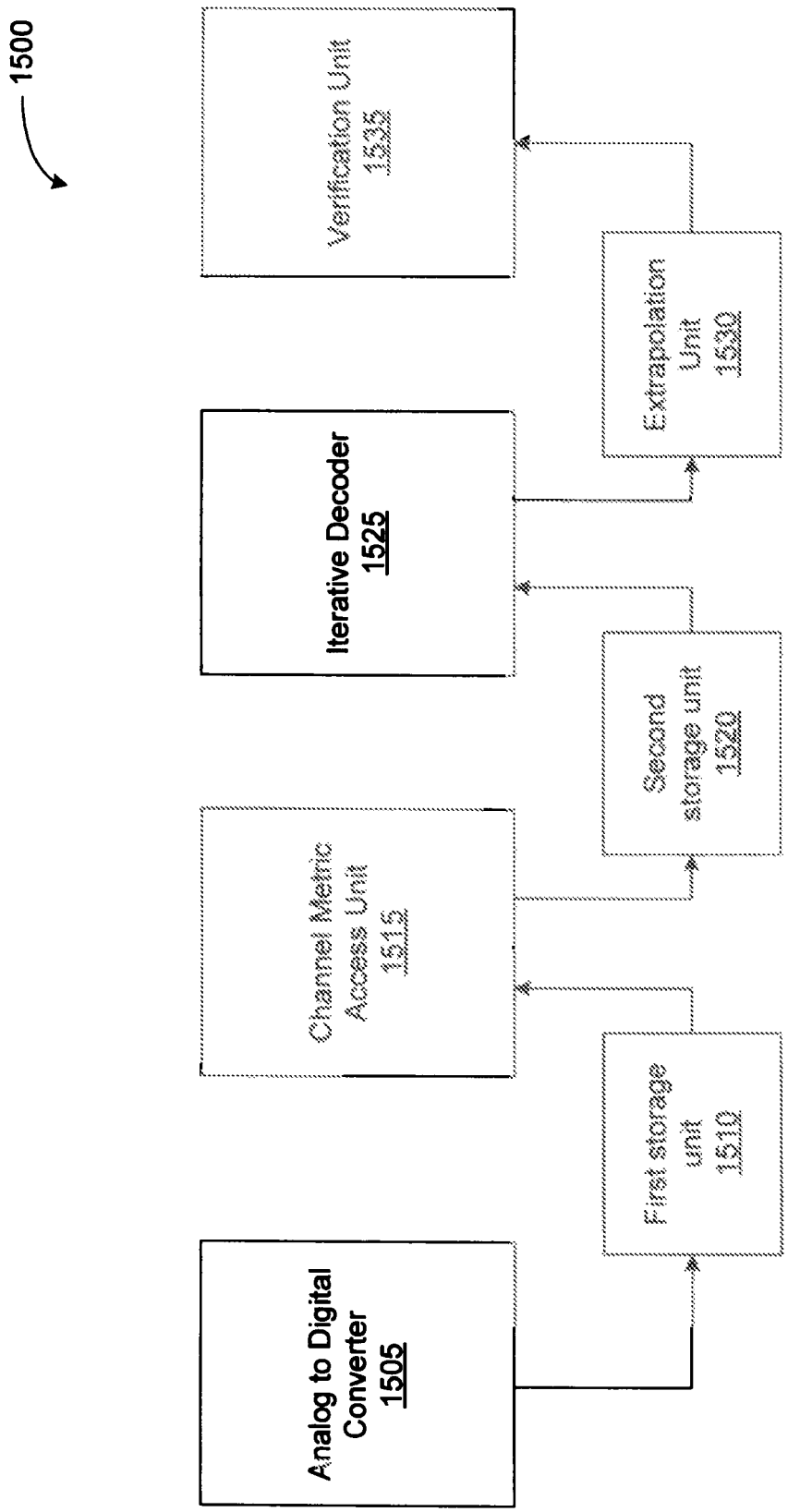
FIG. 15 is a schematic of an example of a system for signal analysis.

FIG. 15 is a schematic of an example of a system 1500 for determining a PN phase of a signal. The system can include an ADC 1505. The ADC can receive a signal from a source. The source can be a device in a UWB system. The received signal can be an analog signal modulated by a PN sequence. The ADC can digitize the signal. The system can include a first storage unit 1510. The digitized signal can be stored in the first storage unit. The system can include a channel metric access unit 1515. The channel metric access unit 1515 can divide the digitized signal into multiple sample blocks. The system can include a second storage unit 1520. The second storage unit 1520 can store each of the sample blocks. In some implementations, the first storage unit 1510 and the second storage unit 1520 can be RAM located in the same device. The system can include an iterative decoder 1525. The iterative decoder can include hardware architecture configured to estimate the PN phase embedded in the sample block using iMPA executed on a redundant graphical model. The system can include an extrapolation unit 1530. The extrapolation unit can use the PN phase estimated by the iterative decoder 1525 to extrapolate the PN sequence over the plurality of sample blocks. The system can include a verification unit 1535. The verification unit 1535 can correlate the extrapolated sequence with the digitized signal stored in the first storage unit 1510. If the correlation coefficient satisfies a predetermined threshold, the estimated PN phase can be determined to be a good estimate of the actual PN phase by which the received signal is modulated. If the correlation coefficient does not satisfy the predetermined threshold, then the system can repeat the process with a new digitized signal received from the source.

A number of implementations have been described. Nevertheless, it will be understood that various modifications may be made without departing from the spirit and scope of the disclosure. For example, parallel FBA architecture (i.e., instantiating multiple forward and backward units to process multiple data segments in parallel) can be used to further lower $T_{acq}$. The increase in logic can be expected to be approximately linear when the speed up factor does not exceed 8 because the observation window is already divided into 8 segments in the iterative decoder and each of them can be run in parallel. For lower speed applications, single port memory can be used and the update can be run sequentially. Such a design can save in the number of adders and reduce the routing resources. The logic gate count can be expected to scale linearly for target pulse rate varies from 500 kpulses/s to 32 Mpulses/s. The design can be extended to operate at even lower SNR. Auxiliary model decoders as well as memories can be added for saving the messages from the additional decoders. Since a $6^{th}$ order model is approximately three times more complex than a $2^{nd}$ order model, the operating $E_c/N_0$ can be lowered to $-13$ dB by tripling the gate count or alternatively, increasing the acquisition time by 3 times and tripling the message memory. Accordingly, other embodiments are within the scope of the following claims.

What is claimed is:

1. A method for signal analysis, executed by a decoder, the method comprising:
digitizing, by the decoder, a signal modulated by a pseudo noise (PN) sequence;
dividing, by the decoder, the digitized signal into a plurality of sample blocks; and
estimating, by the decoder, a PN phase embedded in a sample block of the plurality of sample blocks using an iterative message passing algorithm (iMPA) executed on a primary graphical model augmented with an auxiliary model, wherein the primary graphical model and the auxiliary model are each represented by a respective generator polynomial, and wherein the primary graphical model and the auxiliary model each represent the PN sequence.

2. The method of claim 1 wherein the estimated PN phase is made available to a user.

3. The method of claim 1 wherein the primary graphical model is represented by a generator polynomial, $g(D)=D^{22}+D^1+D^0$, and the auxiliary model is represented by $g(D)=D^{22\times 2^n}+D^{2\ \times 2^n}\times D^0$, wherein n is any integer greater than or equal to 0.

4. The method of claim 1 wherein the primary model and the auxiliary model are based on a same generator polynomial.

5. The method of claim 1 wherein the iMPA uses a forward backward algorithm.

6. The method of claim 1 wherein the auxiliary model generates a same maximal-length sequence (m-sequence) as an m-sequence generated by the primary graphical model.

7. The method of claim 1 further comprising receiving the signal from a source in a spread spectrum system.

8. The method of claim 1 further comprising storing the digitized signal.

9. The method of claim 1 further comprising storing each sample block of the plurality of sample blocks.

10. The method of claim 1 further comprising extrapolating the estimated PN phase over the plurality of sample blocks.

11. The method of claim 10 further comprising statistically comparing the extrapolated sequence with the digitized signal.

12. The method of claim 11 wherein the statistical comparison is correlation.

13. The method of claim 12 wherein the estimated PN phase is considered satisfactory if a correlation value is greater than a threshold.

14. A system comprising:
an analog-to-digital converter configured to digitize a signal;
a channel metric access unit to divide the signal into a plurality of sample blocks; and
hardware architecture configured to estimate a PN phase embedded in a sample block of the plurality of sample blocks using an iterative message passing algorithm (iMPA) executed on a primary graphical model augmented with an auxiliary model, wherein the primary graphical model and the auxiliary model are each represented by a respective generator polynomial, and wherein the primaryaphical model and the auxiliary model each represent the PN sequence.

15. The system of claim 14 further comprising a receiver configured to receive the signal from a source in a spread spectrum system.

16. The system of claim 14 further comprising:
a first storage unit configured to store the digitized signal; and
a second storage unit configured to store each sample block of the plurality of sample blocks.

17. The system of claim 14 further comprising an extrapolation unit configured to extrapolate the estimated PN phase over the plurality of sample blocks.

18. The system of claim 17 further comprising a verification unit configured to statistically compare the extrapolated sequence with the digitized signal, wherein the verification unit is further configured to perform correlation on the extrapolated sequence and the digitized signal.

19. The system of claim 14, wherein the primary graphical model is represented by the generator polynomial, $g(D)=D^{22}+D^{1}+D^{0}$, and the auxiliary model represented by $g(D)=D^{22\times 2^{-n}}+D^{2\times 2^{-n}}+D^{0}$, wherein n is any integer greater than or equal to 0.

20. The system of claim 14, wherein the auxiliary model generates a same maximal-length sequence (m-sequence) as an m-sequence generated by the primary graphical model.

* * * * *

UNITED STATES PATENT AND TRADEMARK OFFICE
CERTIFICATE OF CORRECTION

PATENT NO. : 8,069,015 B2  
APPLICATION NO. : 11/738438  
DATED : November 29, 2011  
INVENTOR(S) : Chugg et al.

Page 1 of 1

It is certified that error appears in the above-identified patent and that said Letters Patent is hereby corrected as shown below:

Title page, column 2, line 7, under "OTHER PUBLICATIONS", please delete "Inforamtion" and insert therefor -- Information --.

Column 12, line 58, (line 4 of claim 3) please delete "$D^{2 \times 2^{\wedge}n}$" and insert therefor -- $D^{2 \times 2^{\wedge}n}$ --.

Column 14, line 2, (line 13 of claim 14) please delete "primaryaphical" and insert therefor -- primary graphical --.

Signed and Sealed this  
Twenty-seventh Day of March, 2012

David J. Kappos  
*Director of the United States Patent and Trademark Office*